May 21, 1974 G. McLARTY Re. 28,013

SAFETY SWITCH AND CIRCUIT FOR OIL-BURNING FURNACE

Original Filed Feb. 25, 1970

INVENTOR.
Gordon McLarty
BY Austin A. Webb
ATTORNEY

United States Patent Office

Re. 28,013
Reissued May 21, 1974

28,013
SAFETY SWITCH AND CIRCUIT FOR OIL-BURNING FURNACE

Gordon McLarty, P.O. Box 55, Augusta, Mich. 49012

Original No. 3,645,662, dated Feb. 29, 1972, Ser. No. 14,081, Feb. 25, 1970. Application for reissue June 26, 1972, Ser. No. 266,192
Int. Cl. F23h 5/24
U.S. Cl. 431—22 10 Claims

Matter enclosed in heavy brackets [ ] appears in the original patent but forms no part of this reissue specification; matter printed in italics indicates the additions made by reissue.

ABSTRACT OF THE DISCLOSURE

Oil burning furnace designed to normally operate as subatmospheric pressure in the combustion chamber has an open tube opening from the combustion chamber to the exterior of the furnace adjacent the burner. A normally closed heat responsive fuse or switch is mounted adjacent the outer end of the tube, to be responsive to abnormal back-flow of hot combustion gases from the furnace. The fuse or switch is connected in controlling relation to the power circuit of the burner, to shut off the burner if abnormal back pressure develops in the combustion chamber. The switch and tube are adjustable to vary the degree of sensitivity of system to back pressure.

THEORY OF INVENTION

Most oil burning furnaces are designed to operate at small negative pressures in the combustion chamber. This necessitates a sufficiently free and open passage from the combustion chamber, through the usual heat exchanger and smoke pipe to the chimney, for the hot expanding products of combustion to be drawn off by the draft of the chimney at a rate sufficient to maintain the negative pressure. This system, when operating correctly, prevents any products of combustion from leaking into the hot air circulating system of the furnace, should cracks develop in the heat exchanger.

The proper operating conditions and draft may be impaired by several things; such as stoppage of the chimney, warping of heat exchanger plates to block the normal flow passages for the hot products of combustion, or by soot deposits caused by poor combustion blocking the flow passages. Poor combustion can be caused by improper adjustment of the burner, but it can and does develop gradually in the best of burners. House dirt and dust picked up with the air delivered to the burner gradually collects on the fan and air passages delivering to the burner. This reduces the amount of air below the optimum for which the burner is adjusted, and incomplete combustion results. The undesirable condition is self created and self aggravated. Not only does the dust and dirt continue to accumulate, but soot commences to be deposited in the furnace. This soot accumulation increases the back pressure against which the blower must work, and this further reduces the amount of air which the blower will deliver.

Reduced burner efficiency and soot accumulation is gradual, so its undesirable effects are not readily noticeable. Perhaps the most dangerous condition is developed when soot accumulations develop on the spark or ignition points of the burner. This causes delayed ignition when the automatic controls start the burner. In this condition, the burner can inject an abnormally large amount of fuel into the furnace before the fuel is ignited. The delayed ignition of this large amount of fuel creates an over-pressure or explosion in the furnace that forces fumes, dangerous gases, and fuel particles back into the house and through cracks in the heat exchanger. If actual damage does not occur, still expensive cleaning bills may result to the householder.

The present invention automatically senses the existence of insufficient draft, regardless of its cause. As soon as a positive pressure develops in the combustion chamber, hot gases are delivered through the tube provided by the invention and activate a thermally sensitive switch or fuse to shut down the burner. Shutting down the burner prevents continued operation under inefficient conditions of combustion, and prevents dangerous fouling of the ignition device of the burner. Shut down also stops the overpressure preventing leakage into the circulated hot air. The resulting lack of heat signals the home owner of the malfunction of the furnace so repairs can be made. Note that while repeated start and stop cycles of the furnace caused by operation of an automatic thermal switch will provide some heat, it will not supply the normal full capacity of the furnace and the resultant fall in house temperature will still give notice of the malfunction. In addition, a visual or audible warning signal may be connected to be actuated by the thermal switch.

DESCRIPTION

The drawings, of which there is one sheet, illustrate a preferred arrangement of the safety circuit, and two forms of heat responsive controls or thermal switches which may be used therein.

Figure 1:
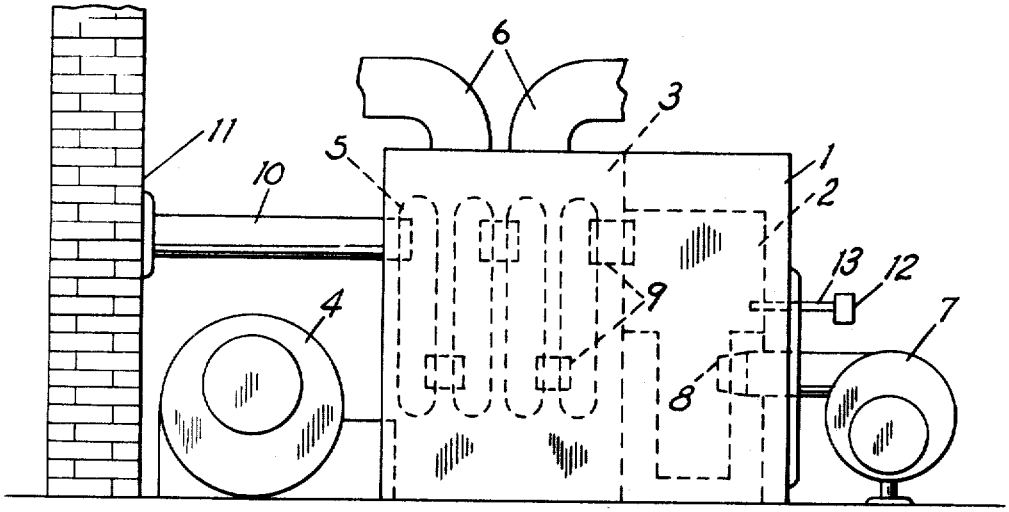
FIG. 1 is a conventional illustration of an oil burning heating system with the safety circuit of the invention applied thereto.

In the drawings 1 represents a furnace housing having a combustion chamber 2, and a plenum chamber 3. An air recirculating blower 4 circulates air to be heated over a heat exchanger 5 in the plenum chamber and out through air ducts 6. An oil burner 7 delivers fuel and air to be burned into the combustion chamber through a nozzle 8, and the products of combustion are directed through connecting passages or pipes 9 of the heat exchanger to the smoke pipe 10 and chimney 11.

Figure 2:
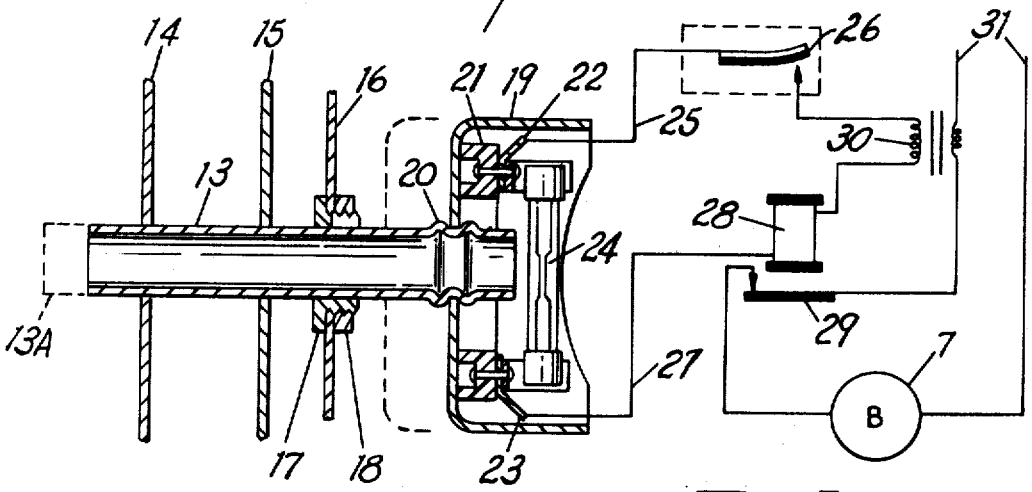
FIG. 2 is an enlarged, fragmentary, cross sectional view through the heat and pressure sensing element of the circuit, with the wiring of the sensing element and the burner controls schematically illustrated.

The heat and pressure sensing switch of the invention 12 is mounted on a small tube or pipe 13 which extends through the front plate of the furnace, to the interior of the combustion chamber. As is shown more clearly in FIG. 2, the pipe 13 projects through holes formed in the wall 14 of the combustion chamber, the wall 15 of the furnace casing, and the front plate 16 of the furnace. A split grommet 17 is positioned around the pipe 13 and clamped thereto by a lock nut 18, so the pipe may be adjusted longitudinally to project at variable distances into the combustion chamber, as at 13A.

The thermal sensing element 12 consists of a suitable housing 19 that is secured to the outer end of the pipe by crimping at 20. An insulating plate 21 secured in the housing supports terminals 22 and 23 which connect to the thermally responsive part of the switch. In the example shown in FIG. 2, the sensing element is a fuse 24 received in clips formed on the terminals. A conductor 25 connects one terminal to the usual thermostatic switch 26 mounted in the space to be heated, and a conductor 27 connects the other terminal to the coil 28 of a solenoid operated switch 29. A step down transformer 30 is connected between the thermostat and the solenoid, and a source of power 31 is connected through the transformer to the solenoid operated switch and the burner 7.

The tube 13 opens closely behind the fuse 24 so that when an over pressure or positive pressure exists in the combustion chamber, the conducting portion of the fuse is melted to de-energise the solenoid 28, open switch 29 and stop the burner. When a fuse 24 is used as the thermally responsive element, it must be replaced before the burner can be restarted.

Figure 3:
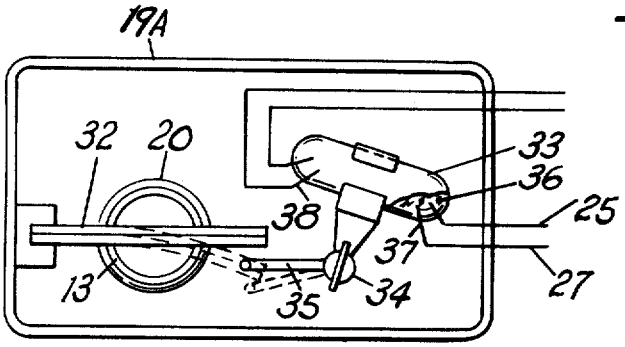
FIG. 3 is a front elevational view of a manually resettable heat sensing switch usable in the circuit.

FIG. 3 conventionally illustrates a mannually resettable thermally responsive switch which can be used in place of the fuse. The housing 19A is clamped to the tube 13 as before. A suitable bimetal strip 32 is anchored to the housing to lie over the open end of tube 13.

A mercury switch 33 is mounted on a manually resettable shaft 34, and the shaft has an arm 35 that extends under the free end of the bimetal strip. As will be apparent, the switch can be tilted from the position shown by bending of the bimetal under the influence of hot air or gases escaping from pipe 13. This causes the mercury 36 in the switch to open the terminals 37. The terminals are connectable to the conductors 25 and 27 of the burner control circuit to shut down the burner. A second set of terminals 38 may be provided in the envelope of the mercury switch to be closed by the mercury when the switch is tilted, and these terminals may be connected to activate an audio or visual alarm signal, not illustrated.

The thermally responsive switch or control 19 or 19A should be far enough from the furnace so that radiant heat does not trip the thermal element. At the same time, the length of the tube 13 exterior to the furnace should not be so long as to cool the escaping gases to the extent that they will not trip the switch.

It will be understood that thermally responsive elements shown are only examples of structures which can be used, and that other known thermally actuatable switches can be used in association with the tube 13 without departing from the spirit and the theory of the invention as claimed hereinafter.

What is claimed as new is:

1. A safety switch adapted to be connected to an oil burning furnace having an exhaust stack and a combustion chamber comprising, a tube adapted to be mounted to extend through a wall of the furnace from the interior of the combustion chamber to the exterior of the furnace and remote from said stack, a temperature responsive electrical circuit breaker mounted adjacent the outer end of said tube and arranged to be opened by temperature of hot gas escaping therethrough, and circuit means connected to said circuit breaker to be controlled thereby and adapted to be connected in controlling relation to the burner of the furnace.

2. A safety switch as defined in claim 1 in which said tube is adjustable axially to vary the amount of its projection into said combustion chamber.

3. A safety switch as defined in claim 1 in which said circuit breaker is a fuse meltable by the heat of gases passing outwardly through said tube.

4. A safety switch as defined in claim 1 in which said circuit breaker includes a heat bendable element positioned to be actuated by gases passing outwardly through said tube.

5. A safety switch as defined in claim 4 in which there is a mercury switch tiltably mounted in said circuit breaker, one end of said bendable element being arranged to tilt said mercury switch.

6. In combination with an oil burning furnace having an exhaust stack, a heat exchanger, and a combustion chamber defined in part by a wall, and an electrically actuated oil burner all arranged in series with the burner arranged to operate in said chamber, an open end tube extending through said wall remotely from said stack opening from the interior of the combustion chamber to the exterior of the furnace, an electrical circuit breaker mounted on said furnace and having a heat responsive element positioned in the path of hot gases expelled through said tube from said combustion chamber and arranged to be opened by such gases, and conductors connecting said circuit breaker in controlling relation to said burner.

7. The combination as defined in claim 6 in which said tube is axially adjustable through said wall to vary the projection of its inner end into said combustion chamber.

8. The combination as defined in claim 6 in which said heat responsive element is adjustable to vary the amount of heat required to actuate the circuit breaker.

*9. A safety switch adapted to be connected to an oil burning furnance having an exhaust stack and a combustion chamber comprising,*

*a tube adapted to be mounted to extend through a wall of the furnace from the interior of the combustion chamber to the exterior of the furnace and remote from said stack,*

*a temperature responsive electrical circuit breaker mounted adjacent said tube at a point exteriorly of said furnace and arranged to be actuated by temperature of hot gases escaping through the tube,*

*and circuit means connected to said circuit breaker to be controlled thereby and adapted to be connected in controlling relation to the burner of the furnace.*

*10. In combination with an oil burning furnace having an exhaust stack and a combustion chamber, a safety control comprising,*

*means forming an opening through the wall of said combustion chamber to the exterior of said furnace and at a point remote from said exhaust stack and said burner,*

*a temperature responsive device mounted adjacent said opening and exteriorly of said combustion chamber to sense the temperature of gases escaping through the opening,*

*and electrical circuit control means arranged to be actuated by said temperature responsive device and connected in electrically controlling relation to the burner of the furnace.*

References Cited

The following references, cited by the Examiner, are of record in the patented file of this patent or the original patent.

UNITED STATES PATENTS

| | | | |
|---|---|---|---|
| 2,870,827 | 1/1959 | Brockbank | 431—22 X |
| 1,688,126 | 10/1928 | Metcalfe | 431—78 X |
| 2,250,113 | 7/1941 | Lockrae | 431—78 X |
| 2,531,887 | 11/1950 | Nehrbas | 431—78 X |
| 2,926,527 | 3/1960 | Crandall | 73—421.5 A |
| 3,537,803 | 11/1970 | Iguazio | 431—22 |

FOREIGN PATENTS

| | | | |
|---|---|---|---|
| 156,009 | 9/1956 | Sweden | 431—22 |
| 636,802 | 2/1962 | Canada | 431—22 |
| 622,120 | 11/1935 | Germany | 411—78 |
| 872,904 | 3/1959 | Great Britain | 73—421.5 A |

EDWARD G. FAVORS, Primary Examiner

U.S. Cl. X.R.

431—16